(No Model.)
G. G. BEEKMAN.
COURT MARKER.
No. 592,046. Patented Oct. 19, 1897.
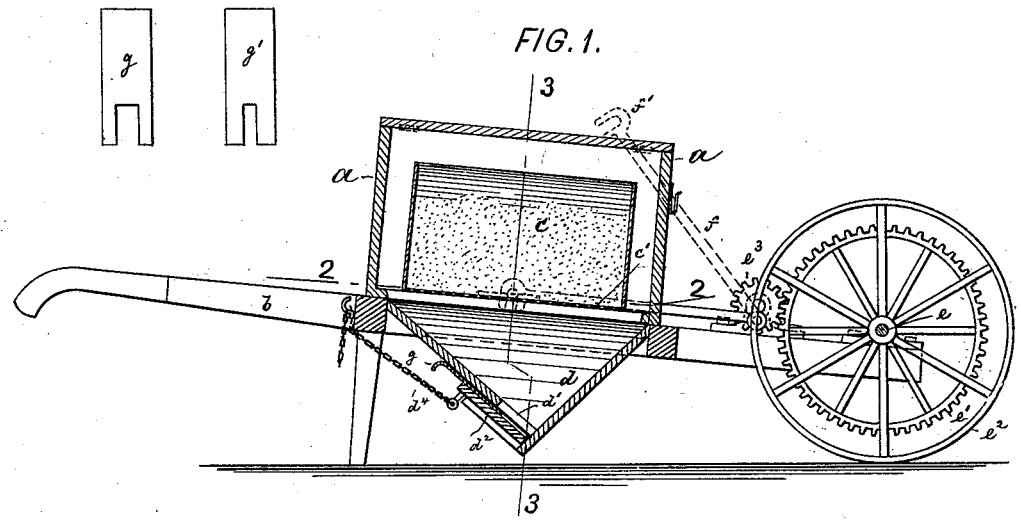
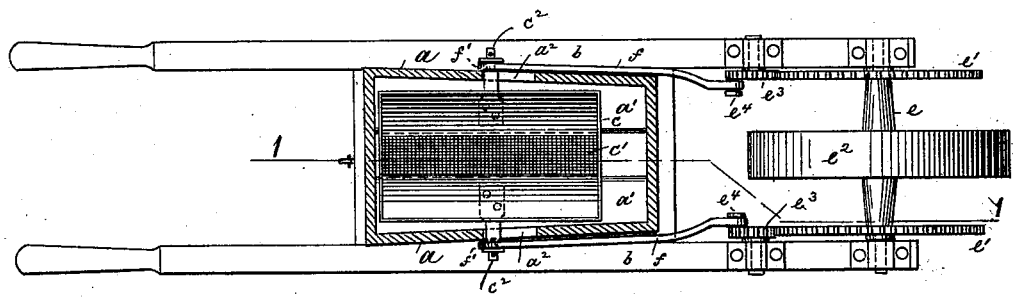
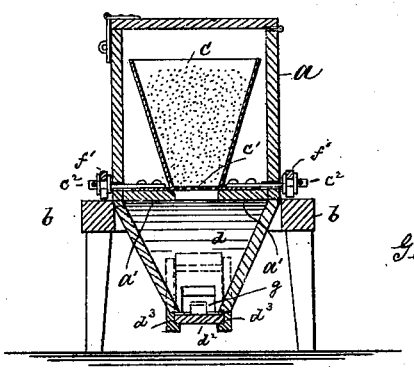
Witnesses:
John Becker
William Miller
Inventor:
Gerard G. Beekman
by his attorneys
Roeder & Briesen
THE NORRIS PETERS CO., PHOTO-LITHO., WASHINGTON, D. C.

UNITED STATES PATENT OFFICE.

GERARD G. BEEKMAN, OF HEMPSTEAD, NEW YORK.

COURT-MARKER.

SPECIFICATION forming part of Letters Patent No. 592,046, dated October 19, 1897.

Application filed February 27, 1897. Serial No. 625,308. (No model.)

*To all whom it may concern:*

Be it known that I, GERARD G. BEEKMAN, of Hempstead, Queens county, New York, have invented an Improved Court-Marker, of which the following is a specification.

This invention relates to an improved apparatus for marking the boundary-lines and courts of sporting-grounds—such as lawn-tennis, foot-ball, base-ball grounds, &c.—with lime, whiting, or other dry powder in a quick and substantial manner.

In the accompanying drawings, Figure 1 is a vertical longitudinal section of my improved court-marker on line 1 1, Fig. 2; Fig. 2, a horizontal section on line 2 2, Fig. 1; Fig. 3, a cross-section on line 3 3, Fig. 1. Figs. 4 and 5 are details of two of the slides $g$ $g'$.

The letter $a$ represents a box having a slotted bottom $a'$ and mounted upon the shafts $b$ of a carriage, such as a wheelbarrow. Within the box $a$ there is contained a sieve $c$, adapted to reciprocate within box $a$ and to discharge its contents through its straining-bottom $c'$ and through the slotted bottom $a'$ into a delivery-hopper $d$, that is arranged below the sieve and projects downwardly from shafts $b$.

Reciprocating motion is imparted to the sieve $c$ by means of the traction-wheel $e^2$, to the axle $e$ of which there is keyed a gear-wheel $e'$ at either side of the traction-wheel. The wheels $e'$ intergear with wheels $e^3$, hung in shafts $b$ and connected by wrist-pins $e^4$ to draw-bars $f$. The hook-shaped rear ends $f'$ of these draw-bars are adapted to engage pins $c^2$, projecting laterally from sieve $c$ and passing outwardly through elongated slots $a^2$ of box $a$. If the hooks $f'$ are coupled to the pins $c^2$, the sieve will be reciprocated by the revolution of the traction-wheel, while, when the hooks are uncoupled from the pins, the barrow may be wheeled over the ground without imparting motion to the sieve. In this way the discharge of the marking-powder through the sieve is at all times under the full control of the operator.

The delivery-hopper $d$ has a discharge-opening $d'$, controlled by a sliding gate $d^2$, which moves in guide-grooves $d^3$, and is adapted to be manipulated by a hand-chain $d^4$.

Between the rear side of the hopper and the gate $d^2$ there is formed a narrow pocket adapted for the reception of one of a number of slotted slides $g$ $g'$, Figs. 4 and 5. These slides are interchangeable and are provided with slots of different sizes, so that by selecting the proper slide the line upon the ground may be gaged. If the gate $d^2$ is closed, the discharge of the marking-powder is of course entirely arrested.

In use the sieve is filled with the marking-powder and is coupled to the driving-axle, while the gate $d^2$ is opened and the proper slide is introduced. If the barrow is now wheeled over the ground, a fine powder-line of predetermined width will be deposited upon the ground along the path of the barrow.

What I claim is—

A suitable frame, provided with handles at one end, and supported at the other by a traction-wheel, the traction-wheel secured to the axle, journaled in the forward end of the frame, toothed wheels secured to the shaft upon which the traction-wheel is secured, and the pinions mounted upon short shafts upon opposite sides of the frame and gearing with the toothed wheels, combined with the connecting-rods which extend through slots in the sides of the inclosing casing, the casing placed upon the top of the frame and inclosing the sieve, a reciprocating sieve, operated by the connecting-rods, and provided with pins to which the rear ends of the rods are fastened, and which pins project through slots in the lower edge of the inclosing frame, a discharge-hopper, placed below the sieve, a gate for closing the opening in the bottom of the hopper, and a series of interchangeable slides having slots of different widths, and adapted to be received within the pocket of the hopper, substantially as specified.

GERARD G. BEEKMAN.

Witnesses:
F. V. BRIESEN,
WILLIAM SCHULZ.